United States Patent
Cheng et al.

(10) Patent No.: US 7,693,678 B2
(45) Date of Patent: Apr. 6, 2010

(54) INTEGRATED CIRCUIT TEMPERATURE MEASUREMENT METHODS AND APPARATUSES

(75) Inventors: Zhibin Cheng, Cary, NC (US); Aleksandr Kaplun, Whitsett, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/460,504

(22) Filed: Jul. 27, 2006

(65) Prior Publication Data

US 2008/0027670 A1    Jan. 31, 2008

(51) Int. Cl.
G01R 7/00    (2006.01)
(52) U.S. Cl. .............. 702/130; 438/54; 257/467
(58) Field of Classification Search ............ 702/64, 702/65, 79, 99, 117, 118, 130, 132, 133, 702/136; 374/170, 178; 327/512, 513; 700/299, 700/300; 361/27, 37; 438/54; 257/467
See application file for complete search history.

(56) References Cited

U.S. PATENT DOCUMENTS

| 4,165,642 | A | | 8/1979 | Lipp | |
|---|---|---|---|---|---|
| 5,446,322 | A | * | 8/1995 | Reynolds | 327/44 |
| 5,457,432 | A | * | 10/1995 | Meszlenyi | 331/111 |
| 6,694,282 | B2 | * | 2/2004 | Perner | 702/130 |
| 7,116,110 | B1 | * | 10/2006 | Li | 324/522 |
| 2003/0082842 | A1 | | 5/2003 | Hwu et al. | |
| 2003/0123522 | A1 | | 7/2003 | Hsu et al. | |
| 2004/0008754 | A1 | | 1/2004 | Clabes et al. | |
| 2004/0263238 | A1 | * | 12/2004 | Thorp et al. | 327/536 |
| 2005/0232333 | A1 | * | 10/2005 | Franch et al. | 374/178 |

OTHER PUBLICATIONS

A. Bakker et al., "Micropower CMOS Temperature Sensor with Digital Output," IEEE Journal of Solid-State Circuits, vol. 31, No. 37, Jul. 1996, pp. 933-937.
G.M; Quenot et al., "A Temperature and Voltage Measurement Cell for VLSI Circuits," In Proc. Euro-Asic' 91, IEEE 1991, pp. 334-338.
V. Szekely et al., "CMOS Sensors for On-Line Thermal Monitoring of VLSI Circuits," IEEE Trans. VLSI Systems, vol. 5, No. 3, Sep. 1997, pp. 270-276.

* cited by examiner

*Primary Examiner*—Manuel L Barbee
(74) *Attorney, Agent, or Firm*—Mark E. McBurney; Schubert Osterrieder & Nickelson PLLC

(57) ABSTRACT

Methods and apparatuses to measure temperatures of integrated circuits are disclosed. New circuit arrangements for measuring temperature using various types of integrated circuit sensor elements are discussed. Embodiments comprise methods and apparatuses arranged to measure temperature based upon current leakage rates of different integrated circuit sensor elements. The methods and apparatuses generally involve using a pulse module to generate a charge for the integrated circuit elements. In these method and apparatus embodiments, one or more elements form a decay module to sense when the voltage decays to a threshold value. The method and apparatus embodiments may also have a module to calculate or infer a temperature from the rate of the voltage decay.

20 Claims, 5 Drawing Sheets

INTEGRATED CIRCUIT TEMPERATURE MEASUREMENT METHODS AND APPARATUSES

FIELD

The present invention generally relates to the field of temperature measurement. More particularly, the present invention relates to methods, apparatuses, and systems to measure temperature in integrated circuits.

BACKGROUND

Designers generally increase performance of integrated circuits by increasing operating frequencies of the circuits and by increasing the number of components, such as transistors, in the circuits. To keep circuit sizes manageable, designers have reduced or scaled down the size of the circuit components so that larger numbers of devices fit within smaller per unit areas. Today it is not uncommon to find advanced computer system chips containing millions, sometimes billions, of transistors. This increased density, however, has created numerous problems. One major problem is heat. Since individual electronic components, such as transistors, each generate minute quantities of heat while operating, increased numbers of such devices in the newer circuits naturally lead to increased quantities of heat.

Compounding the problem of heat is the desire for designers to continually shrink the size of devices containing integrated circuits. For example, designers continually strive to make laptop computers and Personal Digital Assistant (PDA) devices smaller, thinner, and lighter. However, as the cases of these devices shrink, so too do the amounts of available surface areas used for cooling and heat dissipation. Proven circuit designs, based on older and larger circuit platforms, may start having temperature-related problems when they are migrated to different platforms having reduced surface areas for cooling.

Heat and high operating temperatures in integrated circuits cause many problems. First, higher operating temperatures tend to change the operating characteristics of integrated circuits. Second, when integrated circuits are operated at high temperatures for extended periods of time, the long-term reliability of the integrated circuits usually decrease. With these concerns of decreased performance and decreased reliability, coupled with the need of increased component density and smaller packaging, designers increasingly need to monitor the temperature of integrated circuits, including high-performance microprocessors and densely populated application specific integrated circuits (ASICs).

Designers often attempt to manage the temperature of an integrated circuit (IC) by regulating the speed at which it operates. For example, a designer may try to reduce the temperature of a high-performance microprocessor by reducing its operating frequency. Additionally, the designers of an IC may protect the circuit from heat-related damage by either increasing the speed of a cooling fan or possibly shutting down or cutting the circuit off. In order to manage and control the temperature in these different situations, designers must incorporate either external sensors or on-chip sensors that measure temperature.

Using on-chip sensors to measure real-time temperatures helps ensure integrated circuits operate within safe thermal zones. Since many integrated circuits today are becoming increasingly complex, with millions of transistors located within numerous regions of the circuit, designers often desire to know the temperature of several spots in those numerous regions. Until recent times most temperature sensors were based on analog complimentary metal-oxide semiconductor (CMOS) circuits. Temperature measurement with such circuits usually required matched transistors. Additionally, these circuits could not be reliably implemented in numerous spots in integrated circuit designs. Consequently, designers implemented such sensors sparingly, usually limiting the number of sensors to one or two in a given circuit.

Many conventional temperature sensors use analog devices, such as differential amplifiers, that transform or convert the analog temperature signals to digital signals. For example, a large number of existing sensors emit either a current or frequency signal that is proportional to temperature. A frequency output requires a current-to-frequency converter. Unfortunately such converters tend to require large amounts of real estate in an integrated circuit, making such technology a poor choice for designers wanting to make numerous temperature measurements without large circuit footprints.

Designers sometimes use another type of sensor, known as a ring-oscillator sensor, for on-chip temperature measurement. Unfortunately, the ring-oscillator sensor also requires a large amount of integrated circuit substrate space. Plus, the ring-oscillator sensor provides relatively low accuracy. Recently, four-transistor (4-T) decay sensors were proposed. The 4-T sensors are based on a closed-loop process which creates a frequency proportional to temperature. However, the suitable operating temperature range is from +30 to +140 degrees Centigrade.

In light of the growing problem of heat and increased operating temperatures in high-performance integrated circuits, what are needed are alternative methods and apparatuses to measure temperatures of integrated circuits. Alternative temperature sensors need to provide relatively accurate temperature measurements which do not require large footprints.

SUMMARY

The problems identified above are in large part addressed by new methods and apparatuses for measuring temperature in integrated circuits, which include processor integrated circuits. One method embodiment generally involves charging one or more transistors in a transistor pair where one of the transistors has a substantially constant bias voltage, measuring a rate of voltage decay of the transistor or transistor pair, and calculating a temperature based upon the rate of voltage decay. The method may also include applying high and low voltages to a gate of one of the transistors to switch the transistor on and off to create the voltage charge for the decay measurement. Alternative embodiments of the method comprise applying a series of pulses to a gate of one of the transistors. An alternative embodiment involves calculating the temperature by counting a series of decay times from a series of pulses.

Another embodiment comprises an apparatus for measuring temperature in an IC. The apparatus generally comprises using a pulse module to charge a node associated with two IC elements and a decay module for measuring a rate of decay of the charged node. The apparatus includes a temperature calculator to calculate a temperature based upon the rate of decay. One embodiment of the apparatus may use a pair of CMOS transistors for the IC elements. Another embodiment of the apparatus may use a flip-flop to create the pulses. Some embodiments comprise using a Schmitt trigger to detect the voltage decay. Other embodiments may use a voltage comparator to detect the voltage decay.

A further embodiment is an IC arrangement that may be used to measure temperature. The IC arrangement comprises a p-FET and an n-FET temperature sensor, a pulse circuit, a voltage drop circuit, and a counter circuit. Some embodiments may use a flip-flop in the pulse circuit. Some embodiments use a Schmitt trigger coupled to a flip-flop to form the pulse circuit.

An even further embodiment is a system capable of measuring temperature in a component of the system. Generally, the system may comprise a power supply, an IC, and a temperature sensor made with two transistors, a charging circuit, a voltage sensing circuit, and a timing circuit. Some embodiments may include a computation module to calculate a temperature measurement based upon the decay time. Some embodiments may exist as cellular telephones or portable computing devices, while other embodiments may exist as desktop and rack-mounted computing devices, video display cards, portable and non-portable multimedia systems, and ASICs.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, apparatuses, and techniques to measure temperature in integrated circuits are disclosed. New transistor sensor and circuit arrangements for various types of integrated circuits, including high-performance processor circuits, are discussed. Embodiments comprise methods, apparatuses, circuits, and systems to measure temperature in integrated circuits by charging integrated circuit elements and measuring the rate of charge decay to calculate temperature. The embodiments generally involve using pulse modules to charge the transistor arrangements, wherein one or two transistors are charged. In these embodiments, a decay module may be used to monitor the rate of decay of the charge created by the pulse module. The rate of decay of the charge may be directly related to the temperature. In other words, the charge may dissipate more rapidly as the temperature increases. Upon measuring the rate of decay, therefore, one may calculate a temperature of the IC.

While portions of the following detailed discussion describe many embodiments comprising CMOS field effect transistors (FETs), upon review of the teachings herein, a person of ordinary skill in the art will recognize that the following invention may be practiced and applied using a variety of IC devices, such as by using junction or unijunction transistors, as well as other metal-oxide-semiconductor devices. All methods and apparatuses of practicing the invention may be interchangeable. Further, some discussions for embodiments describe generating the voltage charge by using a toggle flip-flop triggered by a Schmitt trigger while other embodiments describe using a voltage comparator to trigger another type of bistable device. One of ordinary skill in the art will recognize that such devices and circuit elements are often interchangeable and may produce essentially similar or the same results. Such terms and devices as these and others should be considered to be substituted for the described elements when employed in accordance with similar constraints to perform substantially equivalent functions.

Figure 1:
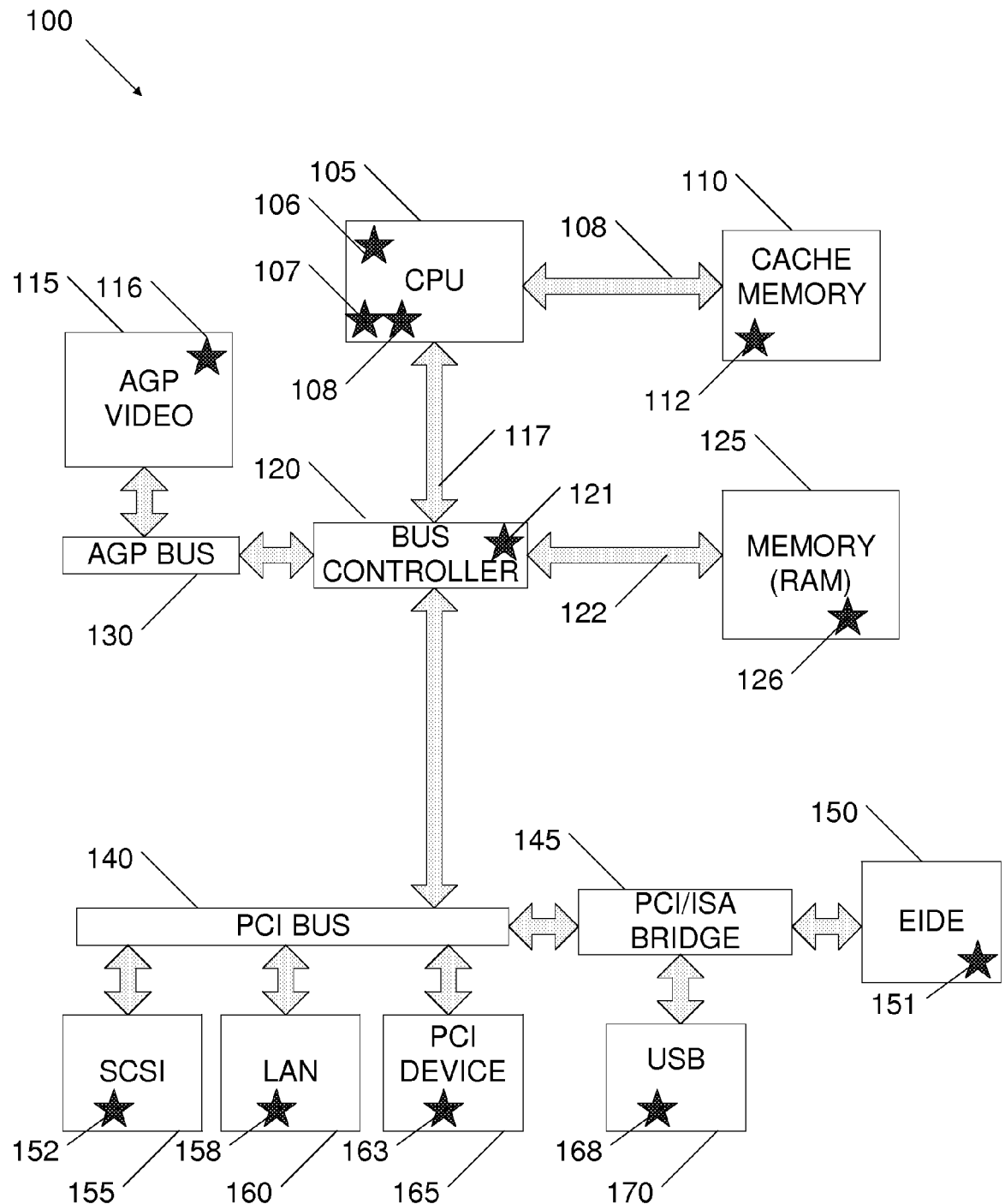
FIG. 1 depicts a system comprising a central processing unit, memory, a video card, bus controllers, and peripheral devices incorporating numerous integrated circuit element temperature sensors.

Turning now to FIG. 1, we see an embodiment of a system 100 illustrating how IC element temperature sensors, such as two-transistor (2-T) temperature sensors, may be placed throughout system 100 to measure numerous temperature spots. For example, system 100 may comprise a desktop computer motherboard attached to several peripheral devices, wherein IC element temperature sensors may be located throughout the computer to monitor the temperatures of different parts of the system. System 100 has a central processing unit (CPU) 105 coupled to cache memory 110 via a backside bus 108. Additionally, a frontside bus 117 couples CPU 105 to a bus controller 120. Bus controller 120 may provide a gateway for CPU 105 to send and retrieve data from other parts of system 100. For example, bus controller 120 may allow CPU 105 to send and receive data to and from system random access memory (RAM) memory 125 via frontside memory bus 122. Additionally, bus controller 120 may allow CPU 105 to display information to a user of system 100 through an accelerated graphics port (AGP) display card 115 by way of AGP bus 130. While not shown in the system architecture diagram of FIG. 1, CPU 105, bus controller 120, RAM memory 125, and other system components may be integrated into a single motherboard.

System 100 may comprise a high-performance computing system. For example, system 100 may comprise a tower or rack server in a demanding business application. System 100 may operate using a relatively high core operating frequency, such as 3.8 gigahertz. Additionally, system 100 may be subject to overheating due to its fast operation or from the environmental conditions surrounding system 100. For example, system 100 may operate in an environment with limited cooling capabilities. Consequently, a system administrator for system 100 may want to ensure that critical parts of system 100 are operating within permissible operating temperatures, such that system 100 is not overheating.

To monitor the temperatures of different parts of system 100, a designer may implement IC element temperature sensors in numerous parts of system 100. As shown in FIG. 1, CPU 105 may incorporate a first temperature sensor 106, a second temperature sensor 107, and a third temperature sensor 108. Temperature sensors 106, 107, and 108 may be located in areas of CPU 105 known to generally operate at higher temperatures, such that overheating may be a problem. Consequently, temperature sensors 106, 107, and 108 may allow a system administrator of system 100 to monitor the temperature of those parts and take action if they start to overheat. For example, the system administrator may provide system 100 with better cooling or lower the surrounding environment temperature.

FIG. 1 also shows how IC element sensors may be located in areas other than just CPU 105. Cache memory 110 may have a temperature sensor 112 and RAM memory 125 may have a temperature sensor 126. Temperature sensors 112 and 126 may inform the system administrator of the operating temperatures of cache memory 110 and RAM memory 125. Cache memory 110 and RAM memory 125 may be subject to overheating problems or the system administrator may just want to monitor their operating temperatures.

Bus controller 120 may have a temperature sensor 121. Temperature sensor 121 may indicate the operating temperature of bus controller 120. For example, system 100 may transfer a large quantity of data between CPU 105, RAM memory 125, Peripheral Component Interconnect (PCI) bus 140, and AGP bus 130. As a consequence of this heavy data transfer, one or more sections of bus controller 120 may be subject to overheating. Temperature sensor 121, and other multiple sensors similar to it, may measure and report the temperatures of bus controller 120.

AGP display card 115 may have a temperature sensor 116. AGP display card 115 may comprise an advanced display adapter in system 100 and be susceptible of overheating. For example, AGP display card 115 may comprise a high-performance graphics card with one or more dedicated graphic processors working in tandem with 512 megabytes (MB) of memory. If system 100 runs a graphics-intensive application, AGP display card 115 may generate a large quantity of heat. In this situation, a system administrator may use temperature sensor 116 to monitor the operating temperature of AGP display card 115.

As alluded to above, system 100 in FIG. 1 may have PCI bus 140 coupled to bus controller 120. Also shown in FIG. 1, PCI/ISA bridge 145 may couple an industry standard architecture (ISA) bus device, such as Enhanced Intelligent Drive Electronics® (EIDE®) device 150 and a universal serial bus (USB) device 170, to bus controller 120 by way of PCI bus 140. In various embodiments, storage devices and other types of peripheral components may have dedicated temperature sensors and be coupled to PCI bus 140 and PCI/ISA bridge 145. For example, in one embodiment a small computer systems interface (SCSI) device 155 may comprise an optical storage drive having temperature sensor 152. Temperature sensor 152 may provide a temperature measurement for the optical storage drive, or any other SCSI device 155, and it may be used to transmit the temperature to other parts of system 100 via PCI bus 140, such as to CPU 105.

In another embodiment, EIDE® device 150 may comprise a hard drive and be coupled to PCI/ISA bridge 145 and bus controller 120 by way of an EIDE® connector and a flat ribbon cable. EIDE® device 150 may have a temperature sensor 151 to monitor the operating temperature of EIDE® device 150 or one of its internal components. Further, in another embodiment, USB device 170 may comprise a flash memory drive, a USB hub adapter, or another type of USB device with temperature sensor 168 coupled to PCI/ISA bridge 145 by way of a USB port.

Even further, in other embodiments, FIG. 1 illustrates that temperature sensors 158 and 163 may be implemented in other types of devices having integrated circuits. Temperature sensor 158 may be incorporated into local area network (LAN) device 160. For example, LAN device 160 may comprise a network communications card, wherein temperature sensor 158 may monitor its operating temperature. Likewise, temperature sensor 163 may be incorporated into a PCI device 165 to monitor its operating temperature. PCI device 165 may comprise one of a variety of devices conforming to the PCI standard, such as an interface card for a scanner or some other peripheral device.

The embodiments in the preceding examples discussed for FIG. 1 illustrate how different elements in a computer system may benefit from temperature measurements from different implementations of IC element sensors. One should note, however, that the preceding examples represent only a small number of examples and many more variations are possible. For example, system 100 may have more or fewer peripheral components and such components may be different than those depicted in FIG. 1. Additionally, each component in system 100 may have one or more temperature sensors. For example, CPU 105 shows to have three temperature sensors, 106, 107, and 108 in FIG. 1. However, CPU 105 may only have one temperature sensor or it may have ten, twenty, or more temperature sensors.

As depicted in FIG. 1, individual components incorporating temperature sensors may be attached to system 100. Such components may be standalone components. In other words, such components may be attached and detached from system 100. For example, USB device 170 may comprise a flash memory storage device which may be transported to systems other than system 100. To illustrate how temperature sensors may be implemented in standalone devices, which may or may not be coupled to a system such as system 100, we turn to FIG. 2.

Figure 2:
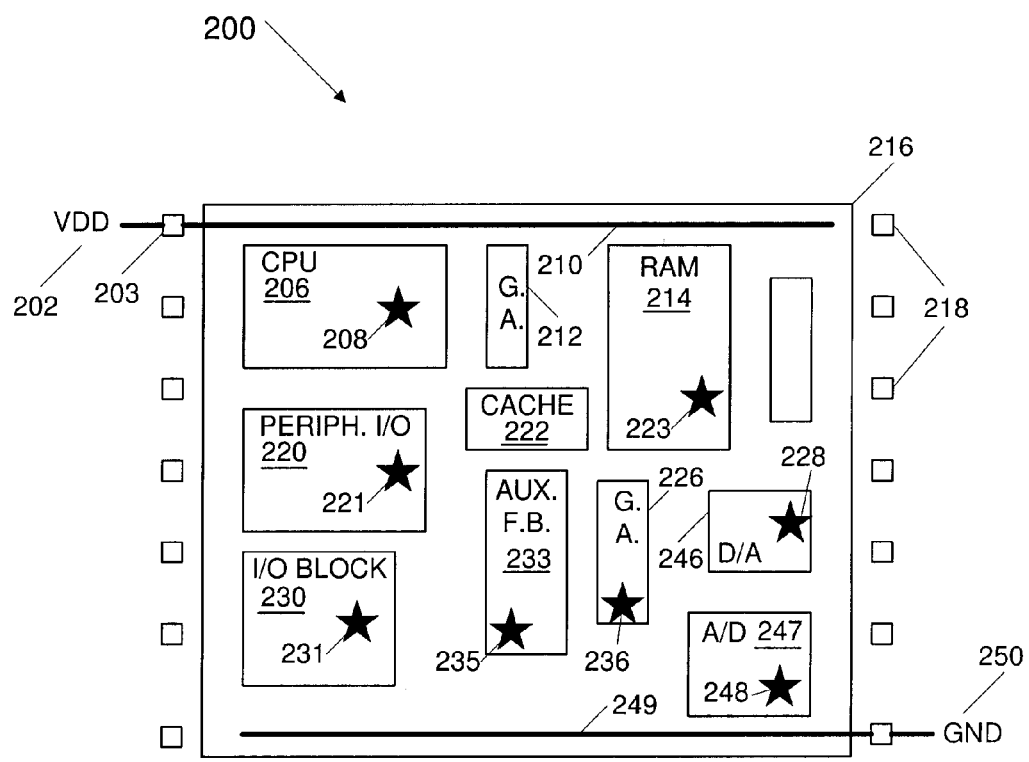
FIG. 2 illustrates how numerous parts of an integrated circuit, such as an integrated circuit in a chip, may incorporate temperature sensors to measure different temperatures of the chip.

FIG. 2 shows an embodiment of an integrated circuit apparatus 200 having several IC element sensors for measuring temperature. As depicted in FIG. 2, apparatus 200 may be an ASIC chip created using a semiconductor substrate 216. For example, apparatus 200 may be an ASIC for a vehicle, such as a car or a military jet aircraft. Apparatus 200 may be divided into numerous functional areas and comprise numerous components, such as a central processing unit (CPU) 206, random access memory (RAM) 214, cache 222, peripheral input-output 220, and an input-output (I/O) block 230. Apparatus 200 may comprise components for translating digital and analog signals, such as an analog-to-digital (A/D) converter 247 and a digital-to-analog (D/A) converter 246. For example, system 100 may be an ASIC for a vehicle emission control unit, with A/D converter 247 and D/A converter 246 translating analog signals to and from a spark timing control unit and an oxygen sensor of the vehicle.

Apparatus 200 may also comprise numerous gate arrays located in various areas of the integrated circuit, such as gate array 212 and gate array 226. Such gate arrays may be used in the ASIC to perform simple computations or logic functions outside CPU 206, working in conjunction with other blocks, such as peripheral input-output 220 and I/O block 230.

Numerous I/O pads 218 may be located around the periphery of semiconductor substrate 216, providing connection terminals for outside power and signal lines to apparatus 200. As depicted in FIG. 2, a power supply system voltage VDD 202 may be terminated on I/O pad 203 and be distributed throughout apparatus 200 by numerous metal traces. For example, metal trace 210 may supply system voltage VDD 202 to temperature sensor 208 of CPU 206, as well as other temperature sensors of semiconductor substrate 216. Likewise, a system ground 250 may be terminated to an I/O pad and distributed to the temperature sensors by metal trace 249.

A designer of apparatus 200 may utilize IC element sensors to measure the temperature of numerous sections or individual circuits of apparatus 200. For example, temperature sensors 208, 223, 221, and 231 may measure temperatures of CPU 206, RAM 214, peripheral I/O 220, and I/O block 230, respectively. Similarly, temperature sensors 236, 228, and 248 may measure temperatures in gate array 226, D/A converter 246, and A/D converter 247, respectively.

The IC temperature sensors of apparatus 200 may be used entirely within apparatus 200, or the sensors may be used to send the temperature measurements outside of apparatus 200. For example, temperature sensor 208 may detect when CPU 206 is overheating and cause CPU 206 to operate with a lower frequency or with reduced features. Alternatively, a temperature sensor 235 located in an auxiliary function block 233 may serve as a central temperature sensor for apparatus 200 and detect when apparatus 200 is running too hot. When apparatus 200 starts to overheat, temperature sensor 235 may trigger logic within auxiliary function block 233 to start a cooling fan coupled to apparatus 200. For example, auxiliary function block 233 may be coupled to an external relay via one or more I/O pads 218. Once an overheating condition is detected, auxiliary function block 233 may close a contact of the external relay causing the cooling fan to turn on and cool apparatus 200.

FIG. 2 illustrates how IC element sensors may be implemented in various parts of an integrated circuit, so that the device may perform internal and external functions related to temperature. Apparatus 200 may exist in many forms in a variety of devices. For example, apparatus 200 may be an integrated circuit in a cellular telephone, a portable computing device, a vending machine, a micro-controller, a television, a stereo, a video camera, an industrial instrument, or any other type of device where measuring temperature of the integrated circuit or surrounding environment may be necessary or desired. To see how one may measure temperature using an IC element temperature sensor, such as a 2-T sensor, we turn now to FIG. 3.

Figure 3:
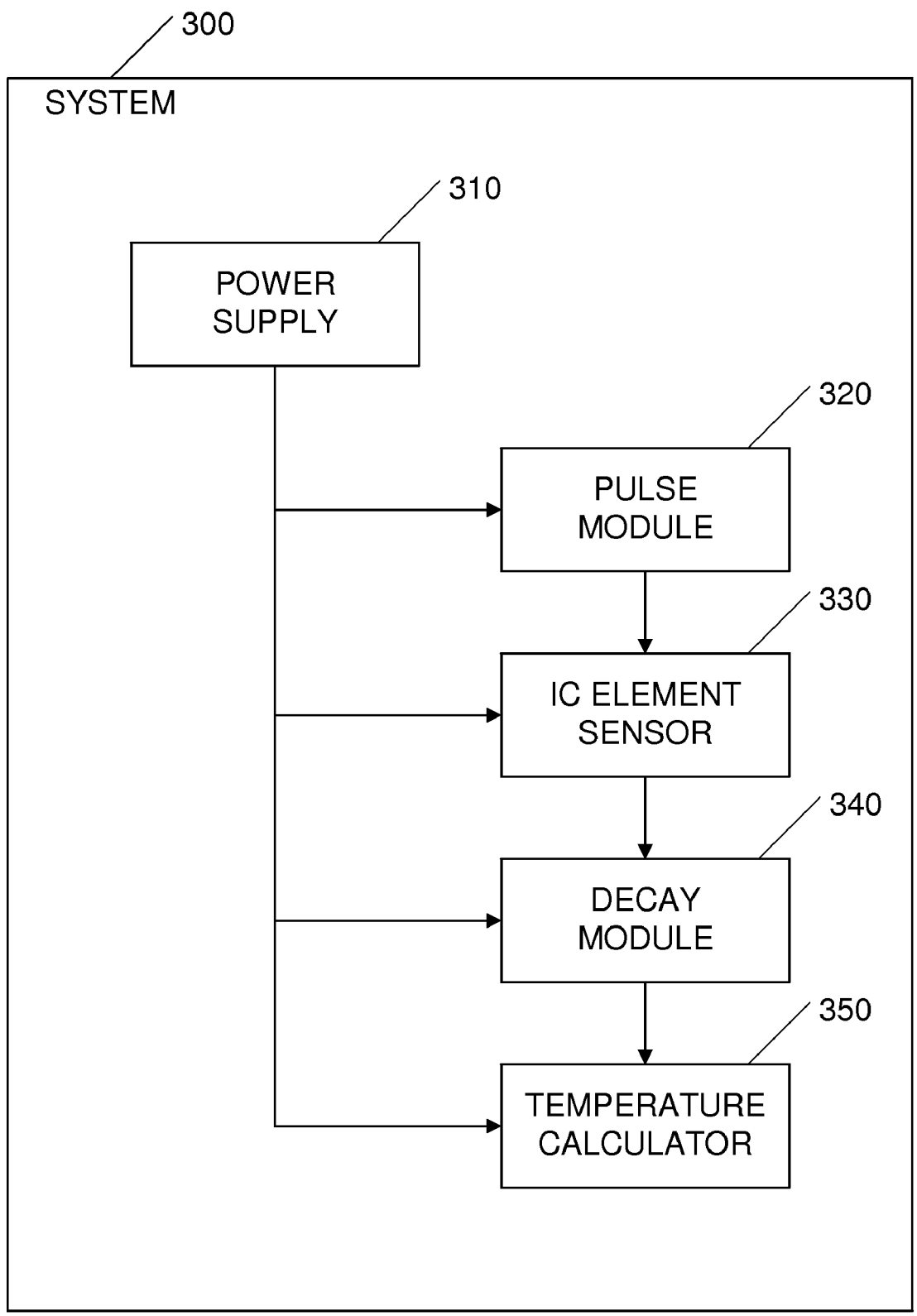
FIG. 3 shows an embodiment of system employing a transistor temperature sensor for measuring temperature, comprising a power supply, a pulse module, a decay module, and a temperature calculator.

FIG. 3 illustrates an embodiment of system 300 employing an IC element sensor 330 for measuring temperature. System 300 has a power supply 310 to supply operating power for system 300. As shown in FIG. 3, power supply 310 may supply power to a pulse module 320. Pulse module 320 may generate a single pulse or a series of pulses for IC element sensor 330. In some embodiments pulse module 320 may generate these pulses to charge IC element sensor 330 to a designated state, such that IC element sensor 330 has a certain magnitude of charge. For example, in one embodiment pulse module 320 may apply a 3.3 volt signal to IC element sensor 330 until a certain node within IC element sensor 330 reaches a charge of 3.1 volts at which time pulse module 320 may remove or uncouple the 3.3 volt signal from IC element sensor 330. Alternatively, in another embodiment pulse module 320 may apply a certain voltage to IC element sensor 330 for a set period of time, irregardless of whether or not the node of IC element sensor 330 has reached a specific voltage. For example, pulse module 320 may apply a 5 volt signal to IC element sensor 330 for a period of 50 nanoseconds.

Once IC element sensor 330 has been charged to a certain potential state and the charging source has been removed or uncoupled, a decay module 340 may monitor the rate of voltage discharge of IC element sensor 330. In some embodiments, decay module 340 may measure the quantity of time for the node of IC element sensor 330 to drop from one voltage potential to another voltage potential. For example, decay module 340 may measure the amount of time for the voltage potential of the node to drop from 3.1 volts to 1.2 volts.

Alternatively, in other embodiments, decay module 340 may measure a number of decay periods instead of only one. That is to say, decay module 340 may measure a series of decay periods following a series of charge cycles created by pulse module 320. Monitoring the series of decay periods of IC element sensor 330 may allow decay module 340 to determine the charge decay rate more accurately by obtaining an average decay rate, which may help filter out any anomalous decay rate measurements leading to inaccurate temperature measurements.

Decay module 340 may transfer the measurement of the decay rate to a temperature calculator 350. When decay module 340 measures only one decay period, or a relatively few decays periods, decay module 340 may communicate to temperature calculator 350 the number of nanoseconds that the node of IC element sensor 330 took to drop from a first voltage to a second. For example, decay module 340 may determine that the node dropped from 3.1 volts to 1.2 volts in 2.034 nanoseconds and communicate this quantity of time to temperature calculator 350. In embodiments where decay module 340 measures a series of charge decay periods, decay module 340 may communicate the rate of decay to temperature calculator 350 in the form of a frequency. For example, decay module 340 may generate a pulse every time the voltage of the node of IC element sensor 330 drops below 1.2 volts, or every time that the node has been charged to 3.3 volts. Generating pulses in this manner, and communicating the pulses to temperature calculator 350, may result in temperature calculator 350 receiving a signal that has a frequency related to temperature. This concept of receiving a signal having a frequency corresponding to temperature may be better illustrated with a detailed example.

Suppose that the temperature of the environment surrounding system 300 is 80 degrees Centigrade (C). Suppose further that system 300 has thermally stabilized at a localized temperature of 85 degrees C. At this temperature, decay module 340 may detect that pulse module 320 charges IC element sensor 330 at a frequency of 800 megahertz (MHz). If the environment surrounding system 300 increases to 95 degrees C., for example, then system 300 may thermally stabilize at 100 degrees. At 100 degrees, decay module 340 may detect that pulse module 320 charges IC element sensor 330 at a frequency of 1100 MHz.

Temperature calculator 350 may receive the decay rate signal from decay module 340 and use it to calculate a temperature. Continuing with our previous example, temperature calculator 350 may determine that a frequency of 800 MHz corresponds to 95 degrees C., while 1100 MHz corresponds to 100 degrees C. Temperature calculator 350 may calculate temperature in a variety of different ways in different embodiments. In some embodiments, temperature calculator 350 may consist purely of hardware elements, while in other embodiments temperature calculator 350 may comprise a software algorithm. For example, temperature calculator 350 may comprise one or more latch devices coupled to an Electrically Erasable Programmable Read Only Memory (EEPROM) device. The latch device may capture a number in the form of a digitally encoded 16 bit double word transmitted from decay module 340, wherein the number corresponds to either the decay rate or a frequency related to the decay rate. Upon capturing the number, the temperature calculator may use the encoded double word to index a pre-encoded temperature corresponding to the value of the number. For example, the encoded word transmitted from decay module 340 may be "0000010001001100", corresponding to 1100 MHz. The latch device may capture this binary value, feed it to the EEPROM which will then provide an output value of "1100" based upon a table in the EEPROM. To facilitate this translation, temperature calculator 350 may also have other elements to interpolate and/or round the inputted values to match one of the indexed values in the EEPROM.

Alternatively, temperature calculator 350 may comprise a software algorithm or a software algorithm coupled with hardware. For example, decay module 340 may store the number related to the decay rate in a memory device, such as RAM or a latch device. A processor may retrieve this number from the memory device and calculate a temperature based upon the value. Continuing with the example above, the processor executing the software algorithm may retrieve "0000010001001100" from the memory device of decay module 340, perform a calculation, and determine that the temperature is 100 degrees C.

One may note that not all embodiments will require temperature calculator 350. Temperature calculator 350 may be appropriate when a temperature indication is necessary. For example, if a person wants to see the actual temperature as measured at IC element sensor 330 on a display screen or a local readout, then temperature calculator 350 may be necessary. Some embodiments, however, may not require conversion. One embodiment may be where system 300 operates a cooling fan. In this scenario, decay module 340 may continually measure the decay of IC element sensor 330 and store a number representing the rate of decay in a memory device. Logic gates may be coupled to one or more bits of the stored number, such that when the stored number reaches or exceeds a particular value the logic gates may activate the cooling fan. In other words, the logic gates may trigger a device in response to a number representing the decay rate instead of a number representing temperature, even though both numbers may be related.

Figure 4:
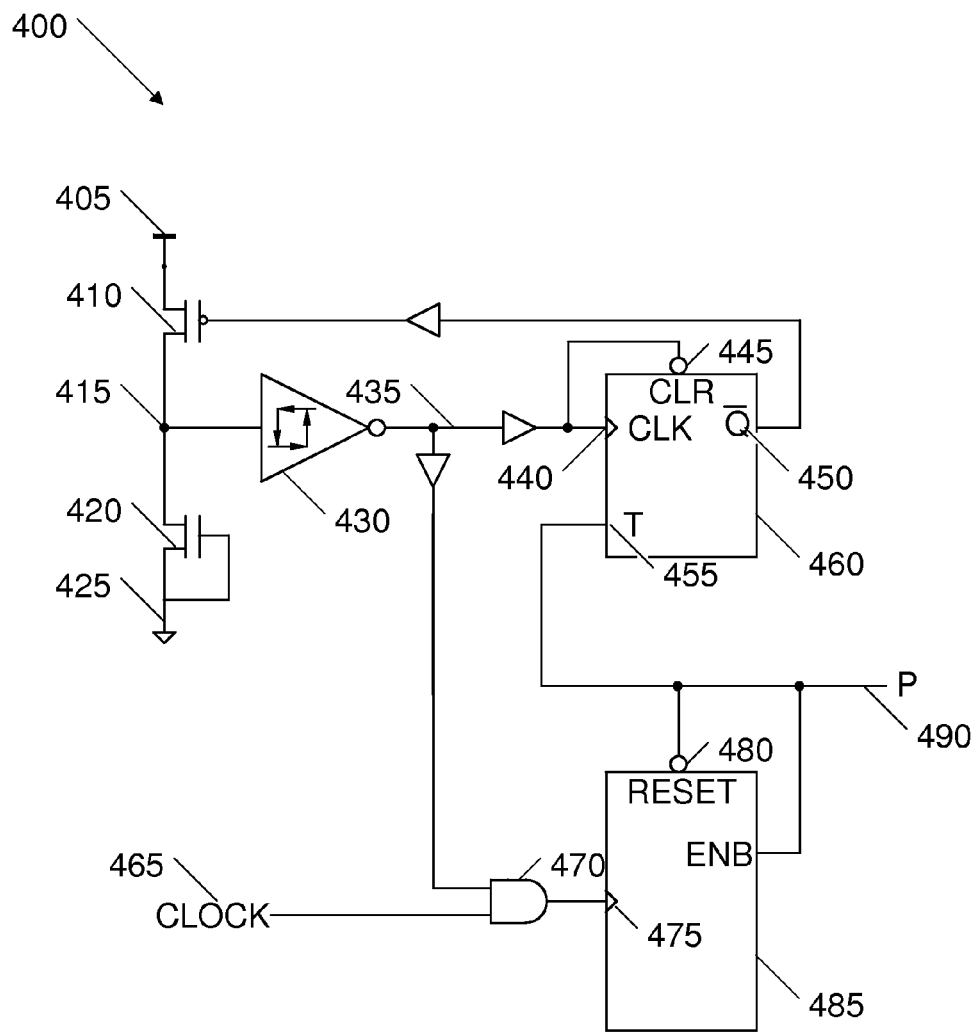
FIG. 4 illustrates a circuit to measure temperature using two transistors, comprising a Schmitt trigger, a toggle flip-flop, and a counter.
Figure 4:
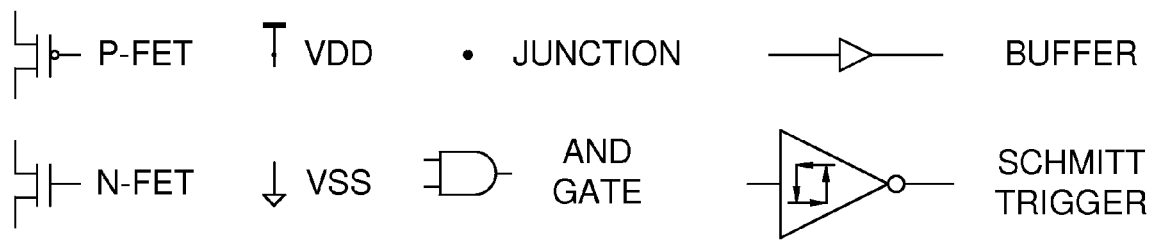

Turning now to FIG. 4, we see an embodiment of a circuit 400 to measure temperature using a 2-T sensor. Circuit 400 may be implemented in an integrated circuit and represent one specific implementation of pulse module 320, IC element sensor 330, and decay module 340 shown in FIG. 3. Generally, circuit 400 may be described by dividing circuit 400 into four separate functional blocks. The first block may include p-FET 410 and n-FET 420, comprising the 2-T sensor. For example, this first block may comprise a CMOS transistor pair. The second block may include toggle flip-flop 460, used to generate a pulse for p-FET 410 and n-FET 420. The third block may include inverting Schmitt trigger 430, used to detect a charge decay and trigger another pulse from toggle flip-flop 460. The fourth block may include counter 485 to accumulate the number of pulses generated by Schmitt trigger 430, which may be related to the temperature of p-FET 410 and n-FET 420.

A system may utilize circuit 400 to measure temperature since sub-threshold leakage current is related to temperature. More specifically, sub-threshold leakage current may be related to temperature and described by the following equation: $I=k*e^{((-q*Vt)/(a*kb*T))}$, where 'q' and 'kb' are physical constants, 'a' and 'k' are device parameters, and 'T' is the absolute temperature. The sub-threshold leakage current may also depend on 'Vt', but if the product of 'a' and 'kb' is much larger than 'q' the variation of the threshold voltage may be minimized.

A voltage potential may be applied to p-FET 410 and n-FET 420 in order to supply the operating power for the sensor. As depicted in FIG. 4, a positive power supply voltage Vdd 405 may be connected to the drain terminal of p-FET 410, while the power supply ground Vss 425 may be connected to the source and gate terminals of n-FET 420. Applying supply ground Vss 425 to the gate terminal of n-FET 420 will make it operate in a cutoff state. Initial application of supply voltage Vdd 405 and supply ground Vss 425 to p-FET 410 and n-FET 420 may start charging the pair. While not shown in FIG. 4, supply voltage Vdd 405 and supply ground Vss 425 may also be used to supply operating power to Schmitt trigger 430, toggle flip-flop 460, and counter 485. After applying initial power to toggle flip-flop 460, output Q' 450 will go high and reverse bias p-FET 410. Note that the gate of n-FET 425 is coupled to supply ground Vss 425, essentially keeping n-FET 420 from turning on during normal operation. Consequently, a charge potential created at node 415 will tend to decrease and approach the potential of supply ground Vss 425 whenever p-FET 410 is turned off.

Whenever node 415 goes low, output 435 of Schmitt trigger 430 will go high. As noted, upon initial power-up, Q' 450 will be high, keeping p-FET 410 turned off. Consequently, the potential of node 415 will remain low causing output 435 of Schmitt trigger 430 to remain high. In this phase of operation, output 435 will apply a high to toggle flip-flop 460 clock input 440 and a corresponding inverted input (low) to clear input 445. Stated differently, a high output 435 will partially enable toggle flip-flop 460 while a low output 435 will disable and clear toggle flip-flop 460. Toggle flip-flop 460 may stay in this state, with Q' 450 high, until triggered or activated by applying a high to preset signal line 490 and T input 455.

When T input 455 goes high, and clock input 440 is also high, toggle flip-flop 460 will change states, send Q' 450 low, and apply a low to the gate of p-FET 410. Applying a low to the gate of p-FET 410 will cause it to be forward biased and increase the voltage of node 415. As node 415 becomes charged from this increase in voltage, the charge will increase past an upper threshold voltage of Schmitt trigger 430 causing output 435 to go low. Sending output 435 low will apply a low to clock input 440 and clear toggle flip-flop 460 due to the corresponding high applied to clear input 445. Upon clearing toggle flip-flop 460, Q' 450 will transition high and reverse bias p-FET 410. Reverse biasing p-FET 410 isolates supply voltage Vdd 405 from node 415.

With node 415 isolated from supply voltage Vdd 405, the charge accumulated at node 415 will tend to dissipate through n-FET 420 due to leakage current flow. As the charge of node 415 dissipates, the charge will decrease past a lower threshold voltage of Schmitt trigger 430 causing output 435 to go high again. As noted, sending output 435 high will apply a high to clock input 440 and remove the high applied to clear input 445. Assuming the preset signal line 490 and T input 455 are both still high, toggle flip-flop 460 will change states and Q' 450 will transition low forward biasing p-FET 410. Once p-FET 410 becomes forward biased, supply voltage Vdd 405 will again increase the voltage of node 415. Once the voltage of node 415 passes the upper threshold voltage of Schmitt trigger 430, output 435 will again transition low. This process of charging, isolating, and discharging node 415 will continue as long as the preset signal line 490 and T input 455 remain high.

The repetitive charging and discharging of node 415, with the associated transitions of output 435 for Schmitt trigger 430, will create a series of pulses that may be tallied with counter 485. As noted the preset signal line 490 will be high during operation of circuit 400. When the preset signal line 490 is high, counter 485 will be enabled and reset input 480 will be low. Whenever clock 465 is high, the successive pulses created by the transitions of output 435 will cause AND gate 470 to apply successive pulses to counter input 475, incrementing counter 485. Arranged in this fashion, one may use counter 485 to count the number of successive discharges of node 415 during a clock cycle.

As noted previously, the rate of current leakage may depend upon the temperature of the integrated circuit containing p-FET 410 and n-FET 420. This rate of current leakage will affect the rate at which Schmitt trigger 430 and output 435 transition high. As a consequence, the temperature of the integrated circuit containing n-FET 420 will determine the number that counter 485 captures during a clock cycle. For example, if the temperature of circuit 400 is 100 degrees C. and output 435 creates a pulse train having a frequency of 1100 MHz, a 10 MHz clock 465 would cause counter 485 to count up to 110 during a clock cycle. Another circuit may be coupled to circuit 400, pull this number from counter 485, and be used to calculate that the temperature is 100 degrees C. In other words, this circuit may determine that the count of 110 pulses corresponds to the temperature of 100 degrees C.

Circuit 400 is one embodiment of a 2-T temperature sensor circuit. Other circuit arrangements with alternate circuit elements are possible and may produce similar results. As depicted in FIG. 4, the embodiment of circuit 400 uses Schmitt trigger 430 to detect the successive charging and discharging of node 415. In alternative embodiments, one may choose to use a voltage comparator or other device. Additionally, instead of using a toggle flip-flop 460, another type of cycling device such as a J-K flip-flop may be used instead. As for counter 485, alternative embodiments may use different devices to determine the decay rate of node 415. For example, some embodiments may utilize a device that calculates the frequency based upon the time between the successive transitions instead of by counting the transitions for a certain period.

In further embodiments, one may arrange and/or operate p-FET 410 and n-FET 420 differently, including different voltage levels for power supply voltages Vdd 405 and Vss 425. For example, one may periodically manipulate the gate of n-FET 420 instead of having it connected directly to ground. In another embodiment, one may use two n-FETs instead of one n-FET and one p-FET. In even further embodiments, one may choose other types of semiconductor elements, such as a JFET. As the above alternative embodiments demonstrate, one may substitute different elements to perform substantially equivalent functions.

Figure 5:
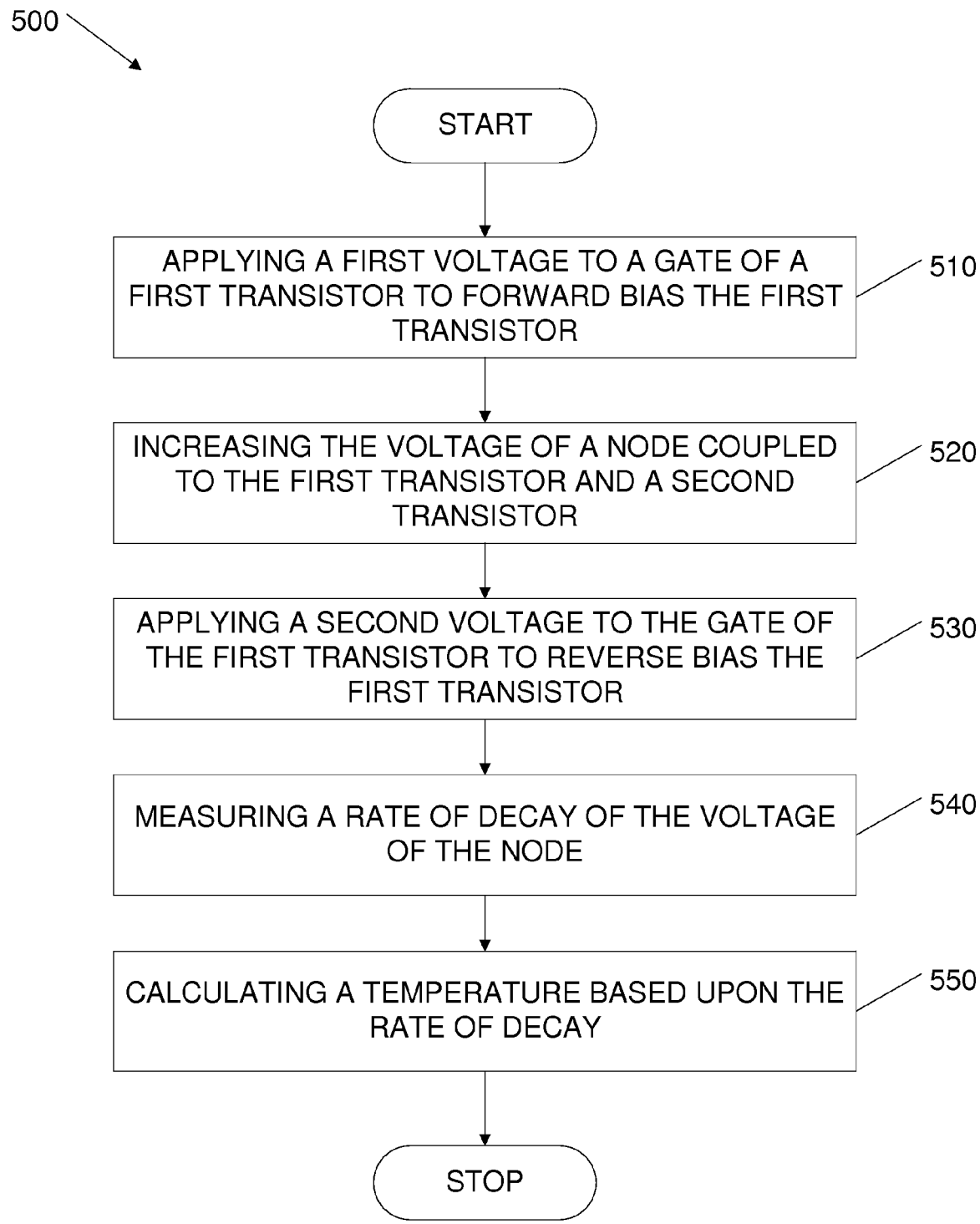
FIG. 5 depicts a flowchart of a method to measure temperature in an integrated circuit by increasing the voltage of a node coupled to two transistors and measuring the rate of decay to calculate the temperature.

FIG. 5 depicts a flowchart 500 illustrating an embodiment of a method to measure temperature in an integrated circuit. Flowchart 500 begins with applying a first voltage to a gate of a first transistor to forward bias the first transistor (element 510). For example, one may apply a voltage potential of 3.3 volts to a gate of a p-FET, where the p-FET is coupled in series to an n-FET at a node.

After forward biasing the first transistor (element 510), an embodiment according to flowchart 500 may continue by increasing the voltage of the node coupled to the first and second transistors (element 520). Continuing with the example above, voltage potential of the node coupling the p-FET and the n-FET may start increasing as a result of forward biasing the p-FET. After the increasing the voltage of the node so that the node has a certain charge, a second voltage may be applied to the gate of the first transistor to reverse bias it (element 530). For example, the previously applied voltage of 3.3 volts may be removed from the gate of the p-FET and replaced by a voltage of 1.1 volts.

Upon charging the node of the first and second transistors (elements 510, 520, and 530), a method according to flowchart 500 may continue by measuring a rate of the voltage decay of the node (element 540). For example, one may determine that charge or voltage potential decreases from 2.9 volts to 1.8 volts in 20 nanoseconds. By measuring this decay rate, one may calculate the associated leakage current rate from which temperature may then be inferred (element 550).

One skilled in the art of integrated circuit design will readily appreciate the flexibility and benefits that the aforementioned example methods and apparatuses for measuring temperature in integrated circuits afford the field of integrated circuits. The specifically described examples are only a few of the potential arrangements wherein the temperature sensors, such as the 2-T sensor, may be operated to calculate the temperature in various types of integrated circuits.

It will be apparent to those skilled in the art having the benefit of this disclosure that the present invention contemplates methods, apparatuses, and systems that may measure temperature in integrated circuits. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is :

1. A method of measuring temperature in an integrated circuit, the method comprising:
    charging at least one of a first transistor and a second transistor,
        wherein the first transistor is coupled to the second transistor, wherein further a first gate of the first transistor is arranged to have a substantially constant bias voltage;
    monitoring a dissipation of the charge of the at least one of the first transistor and the second transistor;
    determining a rate of voltage decay based upon the charge dissipation via leakage current of the first transistor; and
    deriving a temperature based upon the rate of voltage decay.

2. The method of claim 1, further comprising applying a low voltage to a second gate of the second transistor to charge a node between the first transistor and the second transistor.

3. The method of claim 2, further comprising applying a high voltage to the second gate of the second transistor to turn off the transistor.

4. The method of claim 1, further comprising applying a high voltage to a second gate of the second transistor to charge a node between the first transistor and the second transistor.

5. The method of claim 1, wherein charging at least one of a first transistor and a second transistor comprises applying a series of pulses to a second gate of the second transistor.

6. The method of claim 5, wherein deriving a temperature based upon the rate of voltage decay comprises calculating the temperature based upon a total number of decay times from the series of pulses.

7. An apparatus for measuring temperature in an integrated circuit, the apparatus comprising:
   a pulse module to charge a node of a first IC element and a second IC element coupled together in series, wherein the second IC element is arranged to remain in a cutoff state while the apparatus operates;
   a decay module to measure a rate of decay of the charge of the node, wherein the rate of decay is related to the temperature and related to leakage current of the second IC element; and
   a temperature calculator to calculate the temperature based upon the rate of decay.

8. The apparatus of claim 7, wherein the first IC element and the second IC element comprise a CMOS transistor pair.

9. The apparatus of claim 7, wherein the pulse module comprises a flip-flop.

10. The apparatus of claim 9, wherein the flip-flop comprises a toggle flip-flop.

11. The apparatus of claim 7, wherein the decay module comprises a Schmitt trigger.

12. The apparatus of claim 7, wherein the decay module comprises a voltage comparator.

13. The apparatus of claim 7, wherein the temperature calculator comprises a computing module coupled to a counting module.

14. An integrated circuit to measure temperature, comprising:
   a temperature sensor, comprising a p-FET and an n-FET coupled together in series;
   a pulse circuit coupled the temperature sensor, wherein the pulse circuit is arranged to charge a node of the temperature sensor;
   a voltage detection circuit coupled to the node, the voltage detection circuit to detect when the charge reaches a threshold value; and
   a temperature circuit coupled to the voltage detection circuit, the temperature circuit to determine a temperature based upon a rate of the charge reaching the threshold value, wherein the rate of the charge depends upon leakage current of one of the p-FET and the n-FET.

15. The integrated circuit of claim 14, wherein the pulse circuit comprises a flip-flop.

16. The integrated circuit of claim 15, farther comprising a Schmitt trigger coupled to the flip-flop.

17. The integrated circuit of claim 14, wherein the voltage detection circuit comprises an inverting Schmitt trigger.

18. A system capable of measuring temperature in a component of the system, comprising:
   a power supply;
   an integrated circuit coupled to the power supply; and
   a temperature measurement module, wherein the temperature measurement module comprises:
      a first transistor coupled to a second transistor in series;
      a charging circuit to charge at least one of the first and second transistors;
      a voltage sensing element coupled to at least one of the first and second transistors, the voltage sensing element arranged to detect when the charge decays below a threshold value from leakage current of at least one of the first and second transistors; and
      a temperature calculator to calculate the temperature based upon a rate of the charge decaying to the threshold value.

19. The system of claim 18, wherein the temperature calculator comprises a software algorithm to calculate the temperature based upon a frequency generated by the voltage sensing element.

20. The system of claim 18, wherein the system comprises one of a personal computer, a server computer, an industrial computer, a point-of-sale computer, a video display adapter, an audio system, an ASIC of a vehicle, and a portable multimedia device.

* * * * *